United States Patent
Artelsmair et al.

(10) Patent No.: US 6,831,251 B1
(45) Date of Patent: Dec. 14, 2004

(54) WELDING ROD DRIVE UNIT WITH MAIN AND AUXILIARY DRIVES

(75) Inventors: Josef Artelsmair, Wartberg/Krems (AT); Michael Brunner, Seiersberg (AT); Bernhard Mörtendorfer, Ried im Traunkreis (AT)

(73) Assignee: Fronius International GmbH, Pettenbach (AT)

( * ) Notice: Subject to any disclaimer, the term of this patent is extended or adjusted under 35 U.S.C. 154(b) by 90 days.

(21) Appl. No.: 10/130,565

(22) PCT Filed: Nov. 15, 2000

(86) PCT No.: PCT/AT00/00302

§ 371 (c)(1),
(2), (4) Date: Sep. 20, 2002

(87) PCT Pub. No.: WO01/38034

PCT Pub. Date: May 31, 2001

(30) Foreign Application Priority Data

Nov. 19, 1999 (AT) .............................. 1968/99

(51) Int. Cl.$^7$ ................................. B23K 9/12
(52) U.S. Cl. ................................. 219/137.71
(58) Field of Search ............... 219/137.71, 137.7; 226/24, 25

(56) References Cited

U.S. PATENT DOCUMENTS

| | | | |
|---|---|---|---|
| 1,927,896 A | | 9/1933 | Meller |
| 3,483,340 A | * | 12/1969 | Brown .................. 226/25 |
| 3,586,221 A | * | 6/1971 | Rosen ............... 219/137.71 |
| 5,916,464 A | | 6/1999 | Geiger |

FOREIGN PATENT DOCUMENTS

| | | |
|---|---|---|
| CH | 618 115 | 7/1980 |
| DE | 2739351 A1 * | 3/1979 |
| DE | 39 36 532 | 5/1990 |
| DE | 43 20 405 | 8/1997 |
| DE | 297 16 009 | 10/1997 |
| DE | 197 32 379 | 5/1999 |
| DE | 198 55 033 | 5/2000 |
| EP | 0 308 163 | 9/1988 |
| EP | 0 878 263 | 11/1998 |
| GB | 932 909 | 7/1963 |
| GB | 2 120 692 | 5/1982 |
| JP | 08309536 | 11/1996 |

* cited by examiner

*Primary Examiner*—Clifford C. Shaw
(74) *Attorney, Agent, or Firm*—Collard & Roe, P.C.

(57) ABSTRACT

The invention relates to a method of feeding welding wire (13) from a wire supply reel (14) to a welding torch (10), having at least one welding wire feeder (27) and an apparatus, in particular another welding wire feeder (28), for applying a feed force, in particular a main drive (29) and an auxiliary drive (30), whereby a feed force or a pressure force, acting on the welding wire (13) between the welding wire feeders (27, 28) is detected by a detection means, in particular a sensor, and compensated or limited. A deflection or lateral deflection of the welding wire (13) is detected on the basis of the feed force or pressure force on the welding wire (13) between the welding wire feeders (27, 28), in particular the main drive (29) and the auxiliary drive (30), and this deflection is used as information for regulating at least one of the welding wire feeders (27, 28).

35 Claims, 7 Drawing Sheets

WELDING ROD DRIVE UNIT WITH MAIN AND AUXILIARY DRIVES

CROSS REFERENCE TO RELATED APPLICATIONS

Applicants claim priority under 35 U.S.C. §119 of Austrian Application No. A 1968/99, filed on Nov. 19, 1999. Applicants also claim priority under 35 U.S.C. § 365 of PCT/AT00/00302, filed on Nov. 15, 2000. The international application under PCT article 21 (2) was not published in English.

The invention relates to a method of feeding welding wire from a wire supply reel to a welding torch and devices for carrying out the method.

A method and device for feeding a welding wire are already known from patent specification DE 197 32 379 C2, in which the welding wire is fed from a wire supply reel to a welding device, in particular a welding torch, welding wire feeders being assigned respectively to the wire supply reel and the welding torch, in particular an auxiliary device and a main drive, in which fluctuations in force and a feed pressure or a pressure force are compensated and limited. The force fluctuation and the feed pressure or pressure force is compensated and limited within the auxiliary drive by means of an elastically deformable element and the element, which drives the wire without any slip, is arranged between the drive motor and the drive element.

The disadvantage of this system is that the elastically deformable element is linked to the drive motor, so that the rotary motion directly affects the element.

Another device for feeding a welding wire from a wire supply reel to a welding torch is known from patent specification DE 43 20 405 C2, in which the welding torch and the reel of wire are each assigned a wire feeder device, in particular a main drive and an auxiliary drive. A wire wheel unit is arranged between the wire reel and the welding torch, having means for detecting the bending behaviour of the welding wire, this means being provided in the form of a contactless sensor. The sensor signals of the sensor are applied to a control system, which activates the welding wire feeder devices so that a closed wire loop is formed inside the wire wheel unit.

The disadvantage of this system is that a wire wheel unit of this type in which the welding wire forms a wire loop takes up a lot of space.

A device for feeding a welding wire from a wire reel to a welding torch is known from patent specification U.S. Pat. No. 1,927,896 A, in which the welding torch and the wire reel are each assigned a wire feeder device. The welding device is fed from the wire reel to the welding torch along a curved path. To this end, the bending behaviour is measured via a spring-mounted roller, which is applied directly against the welding wire. If tension in the welding wire increases, the roller is deflected downwards so that a contact arm or lever fixed to the roller modifies a controllable resistance. This resistance is linked to the welding wire feeder co-operating with the wire reel, which enables a correction to be applied on the basis of the bending behaviour of the welding wire.

The disadvantage of this system is that fluctuations in the feed to the welding torch affect the control circuit and it can therefore only be used in stationary welding systems unless the configuration of the welding torch is modified.

A welding system is disclosed in patent specification JP 08-309 536 A, in which the welding wire is delivered to a welding torch via a hose pack.

The underlying objective of the invention is to propose a method and a device for feeding welding wire from a wire supply reel to a welding torch and a wire feeder system for feeding and monitoring a welding wire from a wire feel to a welding torch, by means of which the welding wire can be fed slip-free and several welding wire feeder devices used in a welding system can be reliably and simply controlled.

This objective is achieved according to one aspect of the invention due with a method of monitoring the feed force on a welding wire as the welding wire is fed from a sire supply reel to a welding torch, the feed force being supplied by at least one welding wire feeder and another welding wire feeder for applying the feed force acting on the wire in a feed direction and the feed force is detected directly in a wire feed between the at least one welding wire feeder and the other welding wire feeder. This method is characterised in that a displacement of the welding wire transversely to the feed direction caused by the feed force is detected in a tubular sensor between the at least one welding wire feeder and the other welding wire feeder, the feed force or rate of the at least one welding wire feeder or the other welding wire feeder is varied in dependence on the extent of the transverse displacement with the interior of the tubular sensor and the welding wire is deflected by a baffle system in the interior of the tubular sensor from a centered rectilinear position in a predetermined direction whereby the direction of reflection of the welding wire is automatically determined when the required feed force is exceeded.

The advantage of this method is that by using a tubular sensor, the feed pressure and the pressure force of the welding wire can be simply monitored by detecting a short circuit of the welding wire with the housing of the sensor. Another advantage resides in the fact that monitoring the feeder pressure in the feed direction of the welding wire in this manner does not require allowance to be made for other effects on the welding wire, as is the case with the prior art. It is inexpensive to manufacture the sensor in a tube design because no electronic components or moving parts are needed for a sensor of this type.

Other advantageous features are described in the claims. The resultant advantages may be found in the description.

The objective is also achieved according to another aspect of the invention with a device for monitoring a feed force on a welding wire as the welding wire is fed from a wire supply reel to a welding torch, comprising a first welding wire feeder associated with the wire supply reel and another welding wire feeder associated with the welding torch for enhancing the feed force, a tubular sensor arranged between the first welding wire feeder and the other welding wire feeder to detect a fluctuation in the feed force, the wire being fed from the wire supply reel to the welding torch via a hose sack or a guide system, the tubular sensor serving to detect a deflection of the welding wire away from the feed direction in the interior of the tubular sensor, and a baffle system in a housing of the tubular sensor for deflecting the welding wire from a centered rectilinear position in a predetermined direction whereby the direction of deflection of the welding wire is automatically determined when the required feed force is exceeded.

The advantage of this approach is that the most varied range of welding wires can be used and no adjustments or modifications of any kind are needed to detect the feed pressure and the pressure force of the welding wire because the system automatically adjusts to natural stiffness of the respective welding wire. This is possible in particular because of the natural stiffness if the welding wire is exceeded by the feed pressure, the welding wire is deflected and the feed pressure is reduced or compensated by an adjustment to the welding wire feed rate prompted by the short circuit with the housing of the tubular sensor so that the system of welding wire feeders is automatically adjusted to the natural stiffness of the welding wire.

Other advantageous embodiments are described in the claims. The resultant advantages may be found in the description.

Other advantageous embodiments are described in the claims. The resultant advantages may be found in the description.

The objective of the invention is also achieved with a device for welding wire from a wire supply reel to a welding torch, comprising a first welding wire feeder and another welding wire feeder assigned to the wire supply reel provided in the form of a welding wire roller, the wire being fed from the wire supply reel to the welding torch via a hose pack or a guide system, in particular a tube provided in the hose pack or in the guide system, and a wire wheel unit in which the welding wire runs in a looping shape is disposed before the point at which the welding wire enters the hose pack or the guide system, a detection means, in particular a sensor, being assigned to the welding wire in the wire wheel unit to detect the bending behaviour of the welding wire, characterised in that the wire supply reel is disposed so as to rotate at the center of the loop-shared path of the welding wire in the wire wheel unit, the detection means being an angle sensor or a rheostat and the detection means is applied via a rigid lever attached thereto to the welding wire in the wire wheel unit and the detection means is connected to a controller unit for the welding wire feeder and/or the apparatus, in particular the other welder wire feeder. The advantage of this approach is that with a wheel of this type, the feed movements of the welding wire are picked up and absorbed by the wire wheel, thereby providing a simple means of regulating and controlling the welding wire feeder system.

The objective of the invention is also achieved by the characterising features of claims 38 and 39.

The invention will be described in more detail with reference to examples of embodiments.

Of the drawings.

Firstly, it should be pointed out that the same reference numbers are used to denote the same parts in the different embodiments. The details of position given in respect of the different embodiments may be transposed to new positions in terms of meaning when other positions are being described.

An embodiment will be described as an example below with reference to FIG. 1 and although this is not an embodiment of the invention as such, it will help to provide a clearer understanding of the invention.

Figure 1:
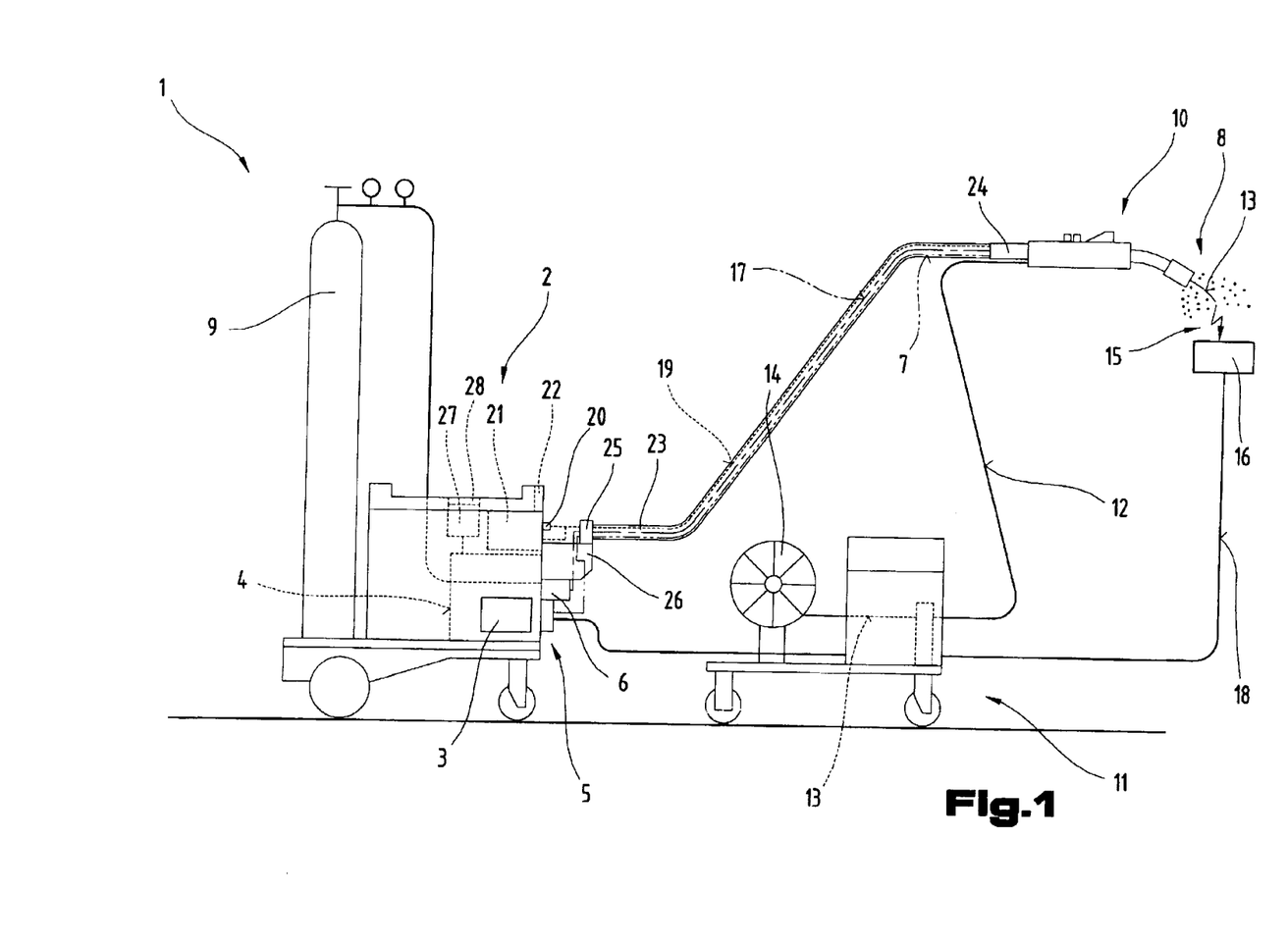
FIG. 1 is a simplified, schematic diagram of a welding machine and a welding device.

FIG. 1 illustrates a welding system and a welding device 1 for a whole range of welding processes, e.g. MIG-MAG welding and TIG welding or electrode welding processes. Clearly, the solution proposed by the invention may be used with a current source or a welding current source.

The welding device 1 has a current source 2 with a power component 3, a control system 4 and a switching element 5 co-operating with the power component 3 and control system 4. The switching element 5 or the control system 4 is connected to a control valve 6 incorporated in a supply line 7 for a gas 8, in particular an inert gas such as $CO_2$, helium or argon and such like, running between a gas storage 9 and a welding torch 10.

Furthermore, a wire feed device 11 such as commonly used for MIG-MAG welding may also be activated via the control system 4 in order to feed a welding wire 13 from a supply reel 14 through a supply line 12 into the region of the welding torch 10. Clearly, the wire feed device 11 could also be integrated in the welding device 1, in particular in the basic housing, in a manner known from the prior art, rather than used as an add-on device as illustrated in FIG. 1.

The current needed to strike an arc 15 between the welding wire 13 and a workpiece 16 is fed via a supply line 17 from the power component 3 of the current source 2 to the welding torch 10 and the welding wire 13, the workpiece 16 to be welded also being connected to the welding device 1, in particular to the current source 2, via another supply line 18 so that a current circuit can be established across the arc 15.

In order to cool the welding torch 10, the welding torch 10 can be connected via a cooling circuit 19, with an integrated flow indicator 20, to a fluid container, in particular a water container 21, so that the cooling circuit 19, in particular a fluid pump used to pump the liquid contained in the water container 21, can be activated when the welding torch 10 is switched on, thereby enabling the welding torch 10 and the welding wire to be cooled.

The welding device 1 also has an input and/or output device 22, by means of which a whole range of settings can be entered for welding parameters and operating modes of the welding device 1. The welding parameters entered at the input and/or output device 22 are then forwarded to the control system 4, from where they are applied to the individual components of the welding system and the welding device 1.

In the embodiment illustrated as an example here, the welding torch 10 is also connected to the welding device 1 and the welding system by means of a hose pack 23. The individual lines from the welding device 1 to the welding torch 10 are disposed in the hose pack 23. The hose pack 23 is connected by means of a connector device 24, known from the prior art, to the welding torch 10, whilst the individual lines in the hose pack 23 are connected to the individual contacts of the welding device 1 by means of connecting sockets and plug connectors. To relieve tension on the hose pack 23, the hose pack 23 is connected via a tension-relieving device 25 to a housing 26, in particular the basic housing of the welding device 1.

Figure 2:
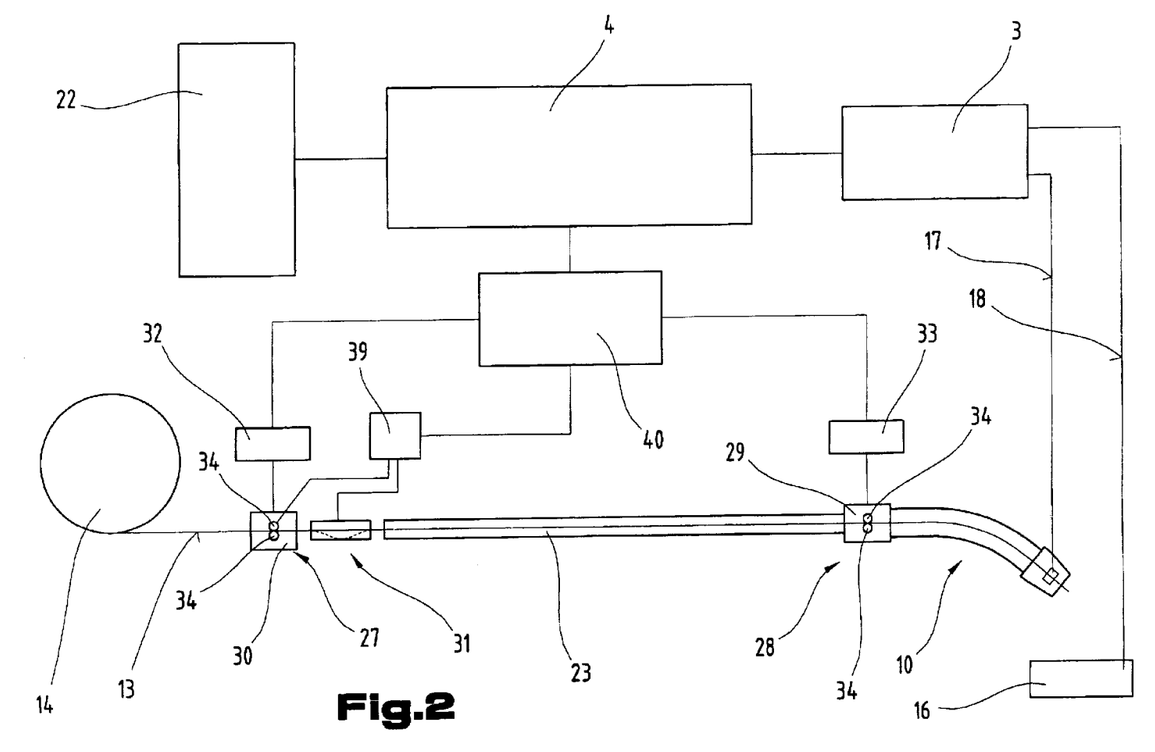
FIG. 2 is a simplified schematic diagram giving an overall view of the welding wire feeder with a system as proposed by the invention.
Figure 3:
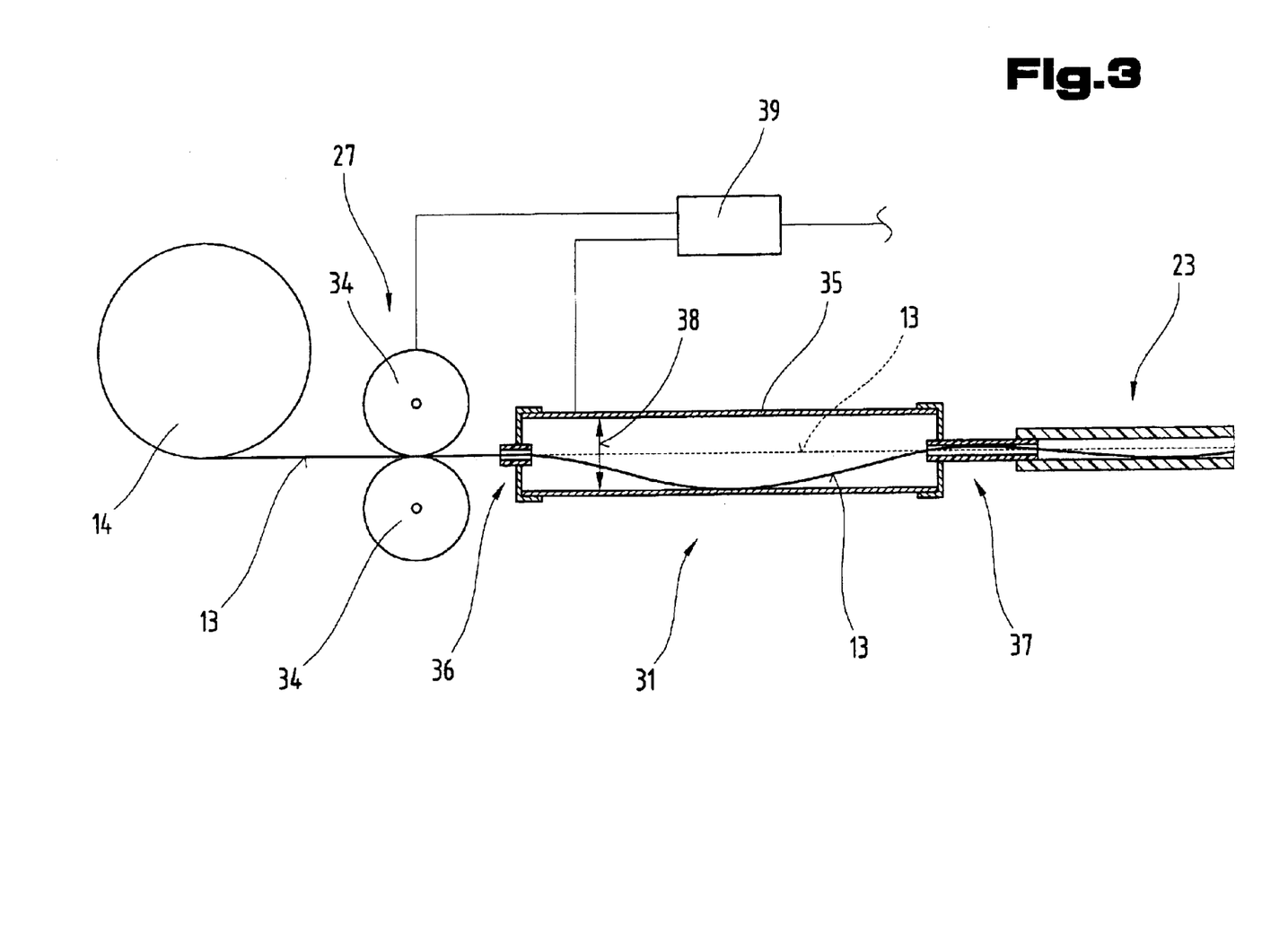
FIG. 3 is a simplified, schematic diagram on an enlarged scale, showing a sensor for the system proposed by the invention used to detect a feed pressure of the welding wire as illustrated in FIG. 1.

FIGS. 2 and 3 illustrate a device for feeding welding wire 13 from a wire supply reel 14 to the welding torch 10, having at least one welding wire feeder 27 and an apparatus, in particular another welding wire feeder 28, for building up a feed force, in particular a main drive 29 and an auxiliary drive 30, a feed force and a pressure force occurring in the welding wire 13 between the welding wire feeders 27, 28 being detected by means of a sensor system, in particular a tubular sensor 31. The feed force and/or rate of at least the welding wire feeder 27 and/or the apparatus, in particular the other welding wire feeder 28, is varied depending on a degree of transverse movement of the welding wire 13. The degree of transverse movement of the welding wire 13 may be determined by a desired/actual comparison, the desired value being a set value within the range in which the sensor system detects no signal. The main drive 29 is disposed on the welding torch 10 or in the region of the welding torch 10 and the auxiliary drive 30 is arranged in the region of the wire supply reel 14 or is assigned to the wire supply reel 14.

The wire is fed from the wire supply reel 14 to the welding torch 10 through the hose pack 23 or a guide system, in particular a tube arranged in the hose pack 23 or guide system. In order to detect a fluctuation in force and a feed force or a pressure force of the welding wire, a tubular sensor 31 is assigned to the welding wire 13. It is arranged between the welding wire feeders 27, 28, in particular the main drive and the auxiliary drive. As schematically illustrated, the welding wire feeders 27, 28, in particular the main drive 29 and the auxiliary drive 30, consist of a drive motor 32, 33 and one or more drive elements 34, in particular drive rollers, acting on the welding wire 13.

The sensor, in particular the tubular sensor 31, is arranged in the longitudinal direction of the welding wire 13, in other words in the welding wire feed direction, and co-operates with the welding wire 13. The tubular sensor 31 is provided in the form of a housing 35, in particular a tube or a tubular element, and a wire infeed guide 36 and a wire outfeed guide 37, the wire infeed guide 36 and the wire outfeed guide 37 being made from a material that is not electrically conductive. The tubular sensor 31, on the other hand, is made from an electrically conductive material and the internal diameter 38 of the tube is larger than an external diameter of the welding wire 13.

The tubular sensor 31 or the housing 35 or tube of the tubular sensor 31 is additionally connected to a detector unit 39. The detector unit 39 is in turn electrically connected to a welding wire feeder 27, in particular the auxiliary drive 30, preferably with the drive element 34. The detector unit 39 is also connected to a speed regulator unit 40 which is needed for the welding wire feeder 27 and the apparatus, in particular the other welding wire feeder 28, and one of the drive motors 32, 33 connected to the speed regulator unit 20 is activated in response to the detector unit 39, i.e. the welding wire feeder 27 or the apparatus, in particular the other welding wire feeder 28, is maintained at a constant speed and the speed of the other welding wire feeder 27 or 28 is regulated on the basis of a signal from the detector unit 39.

The speed regulator unit 40 is also connected to the control system 4, so that a user or welder can set a wire feed rate from the input and/or output device 22, schematically illustrated, enabling appropriate desired values to be sent from the control system 4 to the speed regulator unit 40. The control or regulation process is then run by the speed regulator unit 40 independently of the control system 4 of the welding device 1. To enable a welding process to be run using the schematically illustrated configuration, the control system 4 is connected to the power component 3. The power component 3 is also connected via the welding lines 17, 18 to the welding torch 10 and via a tube to the welding wire 13 and the workpiece 16., enabling the arc 15 to be struck between the welding wire 13 and the workpiece 16.

In order to detect a deflection or lateral deflection of the welding wire 13 due to the feed force or pressure force on the welding wire between the welding wire feeders 27, 28, in particular between the main drive 29 and the auxiliary drive 30, once a welding process has been initiated and the welding wire 13 is being fed from the wire supply reel 14 to the welding torch 10 and an arc 15 has been generated, so that this deflection can be used as data for controlling at least one of the welding wire feeders 27, 28, the sensor, in particular the tubular sensor 31, is arranged between the main drive 29 and the auxiliary drive 30.

When a welding process is activated, a signal representing a speed needed for a specific pre-set wire feed rate is transmitted from the speed regulator unit 40 to the welding wire feeders 27, 28. The main drive 29 is then regulated by the speed regulator unit 40 so that a constant wire feed rate is applied. The auxiliary drive 30, on the other hand, is regulated on the basis of the main drive 29 and at the start of a welding process the wire feed rate produced by the auxiliary drive 30 is higher than that of the main drive 29. The various adjustments applied to the two welding wire feeders 27, 28 enable a feed force and a corresponding pressure force to be applied to the welding wire 13.

The sensor, in particular the tubular sensor 31, detects the feed force and the pressure force transversely to the feed direction of the welding wire 13, i.e. the sensor, in particular the tubular sensor 31, encloses the welding wire 13 so that the welding wire 13 is fed through the sensor. At an optimum feed force, the welding wire 13 runs through the tubular sensor 31 at the center. The internal diameter 38 of the latter is larger than the external diameter of the welding wire 13 and the welding wire 13 is therefore able to move freely in the region of the tubular sensor 31. If the feed force is too high, the welding wire 13 may be deflected within this region, i.e. if the natural stiffness of the welding wire 13 is exceeded, it will seek to ease the pressure acting on it, as a result of which the welding wire 13 will flex or deflect within the room available in the sensor, in particular the tubular sensor 31, where the welding wire 13 is not already being fed.

Consequently, the flexing or deflection of the welding wire 13 away from the center or a center position of the tubular sensor due to the feed force and pressure force on the welding wire 13 will be detected by the sensor, in particular the tubular sensor 31, because when the feed force is optimum and when an optimum pressure force is applied by the auxiliary drive 30 in the direction of the main drive 29, the welding wire 13 runs through the sensor, in particular the tubular sensor 31, at the center or in a center position and is pushed away from the center, in particular away from the center position, when the feed force is increased, as illustrated in FIG. 3.

This flexing or deflection of the welding wire 13 is caused by the speed regulator unit 40 because the speed or a wire feed rate of the auxiliary drive 30 is higher than the speed or the wire feed rate of the main drive 29 at the welding torch 10. In order to reduce or limit the feed force or the pressure force on the welding wire 13, the speed of one of the two welding wire feeders 27, 28, in particular the main drive 29, is held constant by the speed regulator unit 40, whereas the speed of the other welding wire feeder 27, 28, in particular the auxiliary drive 30, is adjusted or reduced, i.e. by reducing the speed, in particular the wire feed rate of the auxiliary drive 30, the feed force and the pressure force on the welding wire 13 is reduced since the main drive 29 continues to feed the welding wire 13 at a constant rate in the direction of the welding torch 10 and less welding wire 13 is taken from the wire supply reel 14 buy the auxiliary drive 30. As a result, the flexing or deflection in the welding wire 13 inside the tubular sensor 31 is eliminated again. In other words, on receiving a signal from the detector unit 39, the speed regulator unit 40 reduces the speed of the auxiliary drive 30, in particular whichever of the welding wire feeders 27, 28 is co-operating with the wire supply reel 14, or increases the speed of the main drive 29. Consequently, in response to a signal received form the detector unit 39, the speed regulator unit 40 controls the welding wire feeders 27, 28 so that the feed force and the power force on the welding wire 13 is reduced or limited and hence the flexing or deflection of the welding wire 13 in the tubular sensor 31 eliminated.

The detector unit 39 transmits a signal to the speed regulator unit 40 if the welding wire 13 is deflected in the interior of the sensor, in particular the tubular sensor 31, in such a way that it comes into contact with the housing 35 of the sensor, in particular the tubular sensor 31, causing a short circuit due to the welding wire 13 between the welding wire feeder 27 acting on the welding wire 13, in particular the drive element 34, and the housing 35 of the sensor, in particular the tubular sensor 31, prompting the speed regulator unit 40 to start reducing or limiting the feed force. The auxiliary drive 30 may be controlled using any methods known from the prior art.

One option, for example, would be for the speed regulator unit 40 to apply an adjustment to the auxiliary drive 30 until the detector unit 39 stops transmitting a signal, in other words the short circuit has been resolved, or a correction could be applied for a pre-settable period, i.e. the speed is varied over a pre-set curve stored in memory for a specific period. Once the feed force in the welding wire 13 has been limited or compensated using the appropriate control process, the speed regulator unit 40 applies a slight increase to the speed or wire feed rate of the auxiliary drive 30 again so that another correction can be applied should a short circuit occur again. Adopting this approach enables an optimum feed force to be set for the most varied of welding wires 13 because the ensuing increase in speed is no longer regulated to the original speed prevailing at the start of the welding process but is slightly higher by a predeterminable or pre-set value than the speed that was just applied in order to eliminate the short circuit.

By using this method to detect the feed pressure, it is also possible to set or permit a specific feed force on the basis of the dimensions of the sensor, in particular the housing 35 of the tubular sensor 31, because the welding wire 13 must be deflected to a corresponding degree in order to generate the desired short circuit.

Figure 4:
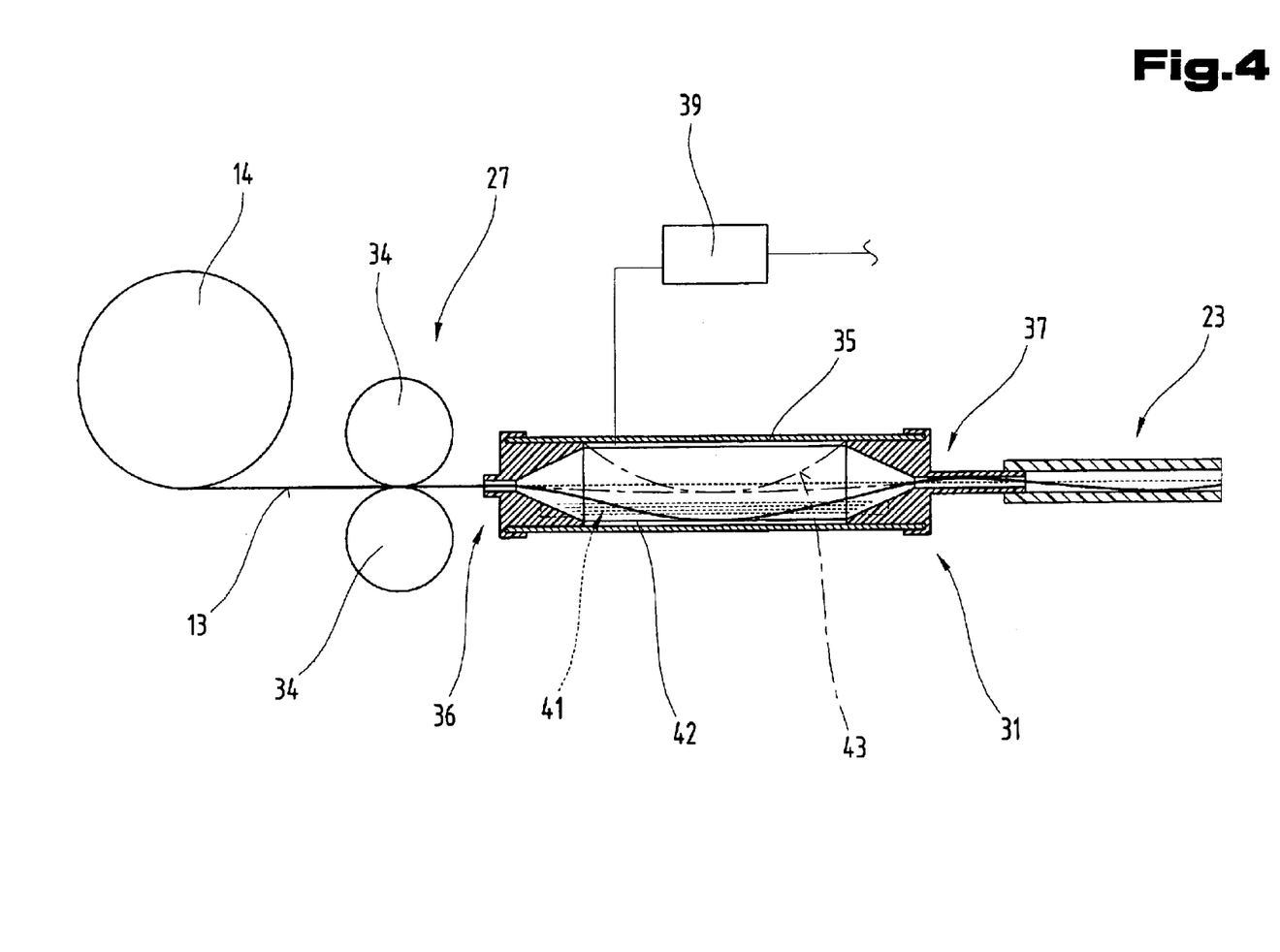
FIG. 4 is a simplified, schematic diagram of another embodiment of a sensor for the system proposed by the invention for detecting the feed pressure of the welding wire.

FIG. 4 illustrates another embodiment of the sensor, in particular the tubular sensor 31, the operating principle of which is the same as that described with reference to the previous drawings.

The tubular sensor 31 in this embodiment has elements inserted in the interior of the housing 35, which enable the deflection and feed force on the welding wire 13 to be detected. It is possible to place, for example at least one light barrier 41 inside the sensor, in particular the tubular sensor 31, as indicated by broken lines, which will detect any deflection in the welding wire 13 from the center position of the sensor, in particular the tubular sensor 31, i.e. a light barrier 41 comprising at least one light-emitting element and one light-sensitive element may be provided and any deflection in the welding wire 13 due to a too high feed force will be detected when this light barrier 41 is crossed, prompting the detector unit 39 to send a signal to the speed regulator unit 40 to control the welding wire feeders 27, 28.

In the embodiment illustrated here, the detector unit 39 is connected to the elements of the tubular sensor 31, which generate a signal on activation, obviating the need for any further connection of the tubular sensor 31 to the auxiliary drive 30. In a design using light barriers 41 in the housing 35 of the sensor, several light barriers may be provided in order to monitor deflection of the welding wire 13 over a larger region.

Instead of or in addition to the light barriers 41 in the interior, in particular inside the sensor, specifically the tubular sensor 31, it would also be possible to provide at least one pressure element 42, which, on contact, would transmit an electric signal proportional to the contact force, which can also be used as a means of detecting any deflection in the welding wire 13.

If this method is used to detected the deflection, the housing 35 of the sensor need not necessarily be tubular. However, in order to ensure that the welding wire 13 is deflected in a specific direction in which the elements, such as the light barriers 41 and/or the pressure elements 42 are arranged when the feed force or pressure force becomes too high, it is preferable to provide a baffle system 43 in the interior of the housing 35, as schematically indicated by broken lines. The purpose of the baffle system 43 is to push the welding wire 13 already at optimum feed force out of the center position, indicated by broken lines, of the housing 35 so that the welding wire 13 is deflected in a predetermined direction. It would no longer be necessary to used a closed housing 35 for this purpose and the welding wire 13 could be guided so that it runs freely across the baffle system 43 and along the side disposed opposite the elements.

The embodiment illustrated in FIG. 4 also has a special design of wire infeed guide 36 and wire outfeed guide 37. The latter have a widening contour towards the interior of the housing 35 of the sensor so that as it is threaded through, the welding wire 13 is guided by the sensor without the need for any additional means.

Figures 5, 6:
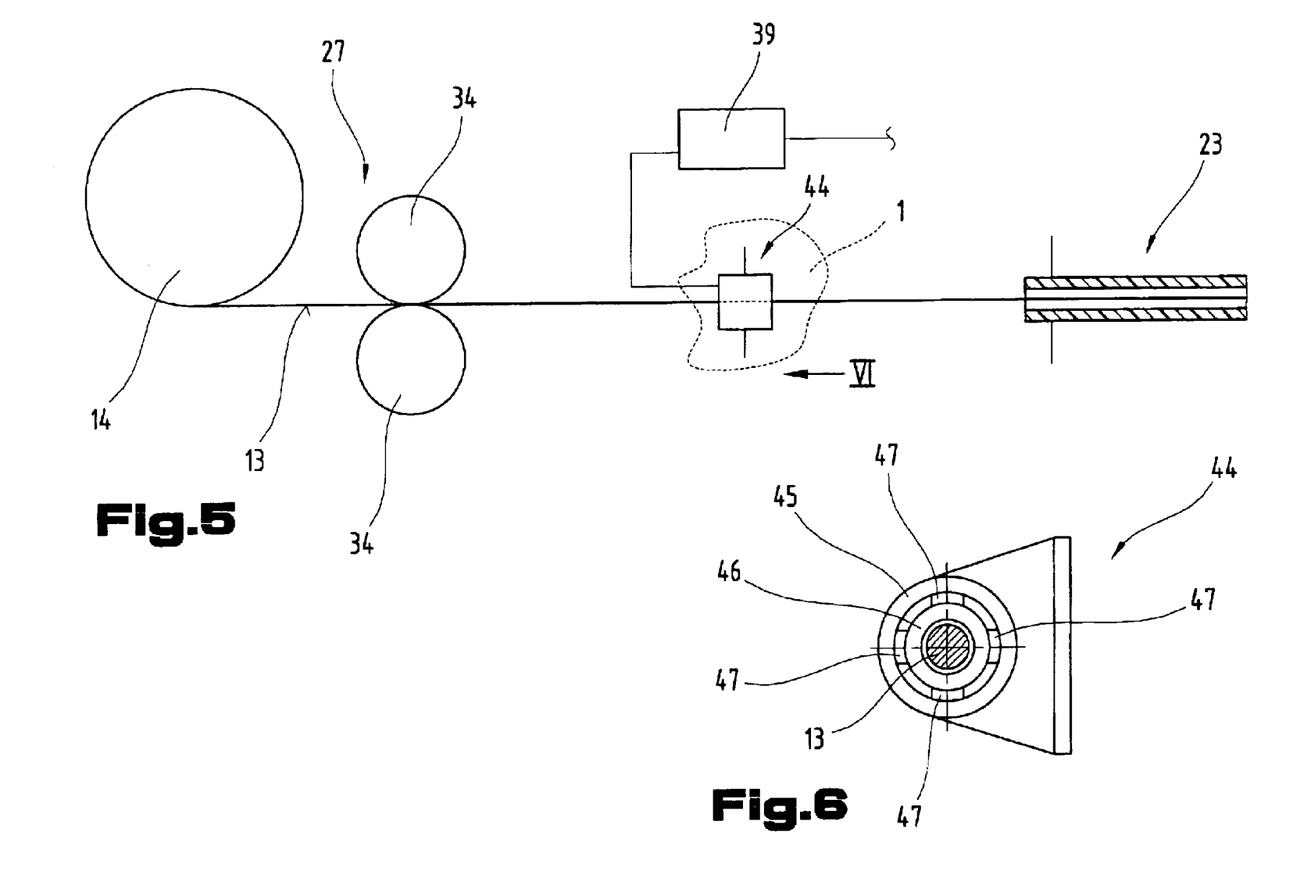
FIG. 5 is a simplified, schematic diagram of another embodiment of a sensor for the system proposed by the invention for detecting the feed pressure of the welding wire.
FIG. 6 is a simplified, schematic diagram, showing the sensor for detecting the feed pressure of the welding wire, viewed in the direction of arrow VI of FIG. 5.

FIGS. 5 and 6 illustrate an example of another embodiment used to detect or sense the deflection of the welding wire 13. In this case, the sensor is a pressure sensor 44, attached to the housing of the welding device 1, the welding wire 13 again being guided through the pressure sensor 44. The design of the pressure sensor 44 is based on an outer and an inner ring 45, 46 with pressure elements 47 disposed in between, the internal diameter of the inner ring 46 being only slightly larger than the external diameter of the welding wire 13 or, if using a tube to guide the welding wire 13, the internal diameter of the ring 46 is slightly larger than the external diameter of the tube.

It is possible to use a lube to guide the welding wire 13 in the region of the sensor in all of the embodiments illustrated in FIGS. 4 to 6, in which a short circuit is needed between the welding wire 13 and the housing 35 of the sensor.

The advantage of using a sensor of this design, in particular the pressure sensor 44, is that a partial or lateral deflection of the welding wire 13 from its normal position is detected by the sensor, in particular the pressure sensor 44, at least at one detector point in the region between the welding wire feeders 27, 28.

However, because of the narrow guide in the pressure sensor, the welding wire 13 can not be deflected from its feed position and only a lateral displacement can be detected or sensed. The advantage of this is that the surface of the welding wire 13 will not be damaged or break.

The advantage of the special design of the pressure sensor 44 enclosing or engaged around the welding wire 13 is that the welding wire 13 can deflect in any direction in the pressure sensor 44 but only a small number of pressure elements 47 is needed because the pressure forces generated by the welding wire 13 are distributed via the inner ring 46 to the pressure elements 47 that are provided. Another advantage of this type of pressure sensor 44 is that the welding wire 13 can be continuously and constantly monitored since the displacement paths or deflection paths of the welding wire 13 are minimal and the welding wire 13 can therefore be fed at a maximum feed force.

Figure 7:
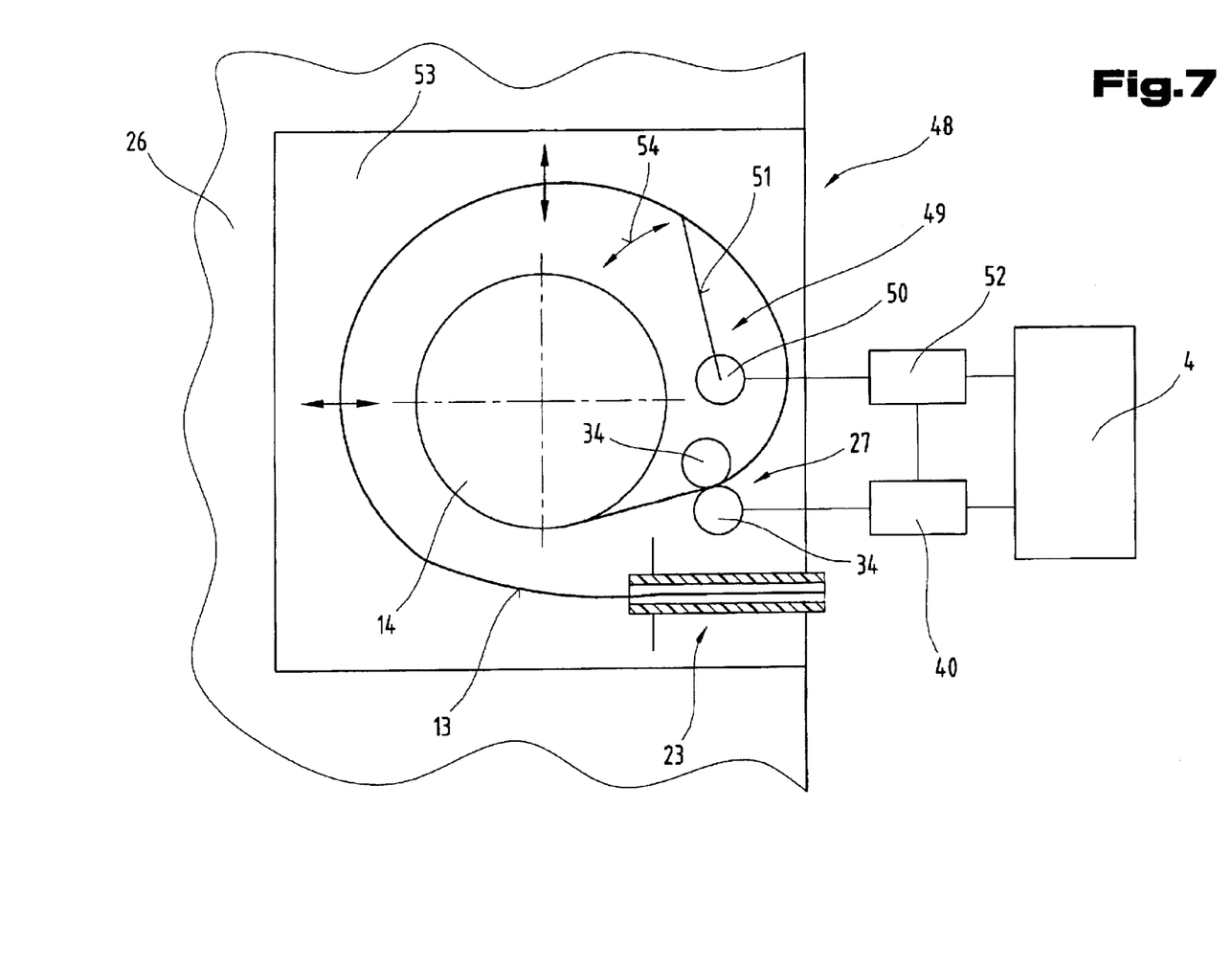
FIG. 7 is a simplified, schematic diagram of a wire wheel system as proposed by the invention, with a detection means for detecting a bending behaviour of the welding wire.

FIG. 7 illustrates an embodiment of a device for feeding welding wire 13 from a wire supply reel 14 to a welding torch 10 (see FIG. 1 or 2), in which at least one welding wire feeder 27 co-operates with the wire supply reel 14.

The wire is fed from the wire supply reel 14 to the welding torch 10 (see FIG. 1 or 2) via the hose pack 23 or a guide system, in particular a tube disposed in the hose pack 23 or guide system. Before the point at which welding wire 13 enters the hose pack 23 or the guide system, a wire wheel unit 48 is provided in which the welding wire 13 is run in a loop-arrangement and a detection means 49, in particular a sensor, for the welding wire 13 is provided in the wire wheel unit 48 in order to detect the bending behaviour of the welding wire 13.

The detection means 49 may be an angle sensor or rheostat 50, the detection means 49 being attached to a rigid lever 51 and thus linked to the welding wire 13 in the wire wheel unit 48, the detection means 49 being set up to monitor the loop-shaped course of the welding wire 13 about the wire supply reel 14. The detection means 49 is also connected to a controller unit 52 for the welding wire feeder 27 in order to forward data used to control at least one welding wire feeder 27. This controller unit 52 transmits an appropriate signal to the speed regulator unit 40 for the drive motor—not illustrated—and preferably to the control system 4 of the welding device 1 so that the speed or the feed rate can be increased ore reduced by the speed regulator unit 40 in response to the signal from the controller unit 52. The welding device 1 may be set up as described earlier with reference to FIGS. 1 to 6 so that the welding torch 10 and a the wire supply reel 14 are each provided with a welding wire feeder 27, 28, in particular a main drive 29 and an auxiliary drive 30, although only the wire supply reel 14 with the wire wheel unit 48 and the associated welding wire feeder 27 are illustrated in the drawing for the sake of retaining clarity. Naturally, it would also be possible to use a configuration incorporating only one of the welding wire feeders 27 or 28.

To enable the welding wire 13 guided along a loop-shaped course to be detected or monitored by the detection means 49, the lever 51 of the detection means 49 is joined to the welding wire 13 so as to be displaced therewith, which means that this lever 51 can be displaced by the welding wire 13 if there is any change in the loop pattern of the welding wire 13. This being the case, the detection means 49, in particular the angle sensor or the rheostat 50, with the lever 51, is preferably arranged inside the loop-shaped course of the welding wire 13. To enable the welding wire 13 to be guided in a loop-shaped pattern in the wire wheel unit 48, several freely displaceable bearing points or guide elements may be provided. In the embodiment illustrated as an example here, the welding wire 13 is guided in a tube, in particular in a plastics tube, which produces an appropriate natural stiffness, and the tube can be fixed as appropriate to produce this loop-shaped pattern.

It should be pointed out that the wire wheel unit 48 consists of a housing case 53 of the housing 26 of the welding device 1, as schematically illustrated. The wire supply reel 14, the welding wire feeder 27, in particular its drive elements 34, and the detection means 49 are arranged in the wire wheel unit 48 or the housing case 53 of the welding device 1, the individual elements being fixed or mounted on a rear wall of the housing case 53, in particular on the housing 26 of the welding device 1, and this housing case 53 is closed off by a cover or a side part of the housing 26 when the welding device 1 is in operation, similar to the manner in which the wire supply reel 14 is mounted or laid out in the welding device 1, known from the prior art.

When a welding process is initiated by the user, the welding wire feeder 27 is set to a pre-set welding wire rate by the speed regulator unit 40 and the welding wire feeder 27 feeds the welding wire 13 from the wire supply reel 14, preferably from a round wire roller. Before the point at which it enters the hose pack 23, schematically illustrated, or a guide system, the welding wire 13 is fed on a loop-shaped freely displaceable course about the wire supply reel 14, i.e. the welding wire 13 is carried by the welding wire feeder 27 towards the welding torch 10 (see FIG. 1or 2), so that it follows a loop-shaped or circular path about the wire roller or the wire supply reel 14 downstream of the welding wire feeder 27. The wire supply reel 14 is rotatably mounted in the wire wheel unit 48 so as to rotate at the center of the loop-shaped course of the welding wire 13.

The advantage of using this type of arrangement is that a so-called wire wheel is formed after the welding wire feeder 27 so that any effects which might otherwise be detrimental to the hose pack 23 or special wire feed requirements, for example a pulsed or forward and reverse feed of the welding wire 13 for a welding process, can be absorbed or compensated in this wire wheel.

If, for example, if the hose pack 23 is moved, the length of the welding wire 13 is compensated without having to adjust the welding wire feeder 27 so that any movements caused by tension and/or pressure on the welding wire 13 do not have a direct impact on the drive elements 34 of the welding wire feeder 27, which significantly increases the service life of the drive elements 34. If, on the other hand, the welding wire 13 is fed to the welding torch 10 in a pulsed wire delivery, a constant welding wire feed can be operated with the welding wire feeder 27 since the displacement of the welding wire 13, in particular if it is halted or moved in reverse, can be compensated in the wire wheel unit 48 by the other welding wire feeder 28 disposed on the welding torch 10, thereby simplifying control of the welding wire feeder 27. Arrow 54 indicates the movement of the welding wire 13 in the wire wheel unit 48 and, as may be seen, in the event of too large a tensile force or too much feed of another welding wire feeder 28, the welding wire 13 is displaced in the direction of the wire supply reel 14. This movement is detected by the detection means 49 and indicated to the speed regulator unit 40, and, once there is a fall below a desired value, the feed rate varying the welding wire 13 in the wire wheel unit 48 is increased by the speed regulator unit 40, enabling this movement to be compensated. If the welding wire feeder 27 feeds the welding wire 13 at too high a rate or if the other welding wire feeder 28 reverses the movement or reverses the feed of the welding wire 13, the loop diameter of the welding wire 13 in the wire wheel unit 48 is increased until another desired value is exceeded, when the loop diameter is reduced again by reducing the feed rate of the welding wire feeder 27.

The advantage of using this wire wheel system is that changes in the welding wire rate can not have a direct knock-on effect on the drive elements 34 of the welding wire feeder 27 and the opposing resistance which occurs in the event of a reverse movement of the welding wire 13 is simultaneously very much reduced, i.e. if the welding wire 13 were moved in reverse without this wheel arrangement, the welding wire 13 would have to be pressed by the welding torch 10 onto the welding wire feeder 27 arranged in the welding device 1 or this welding wire feeder 27 would also have to initiate a reverse movement.

Figure 8:
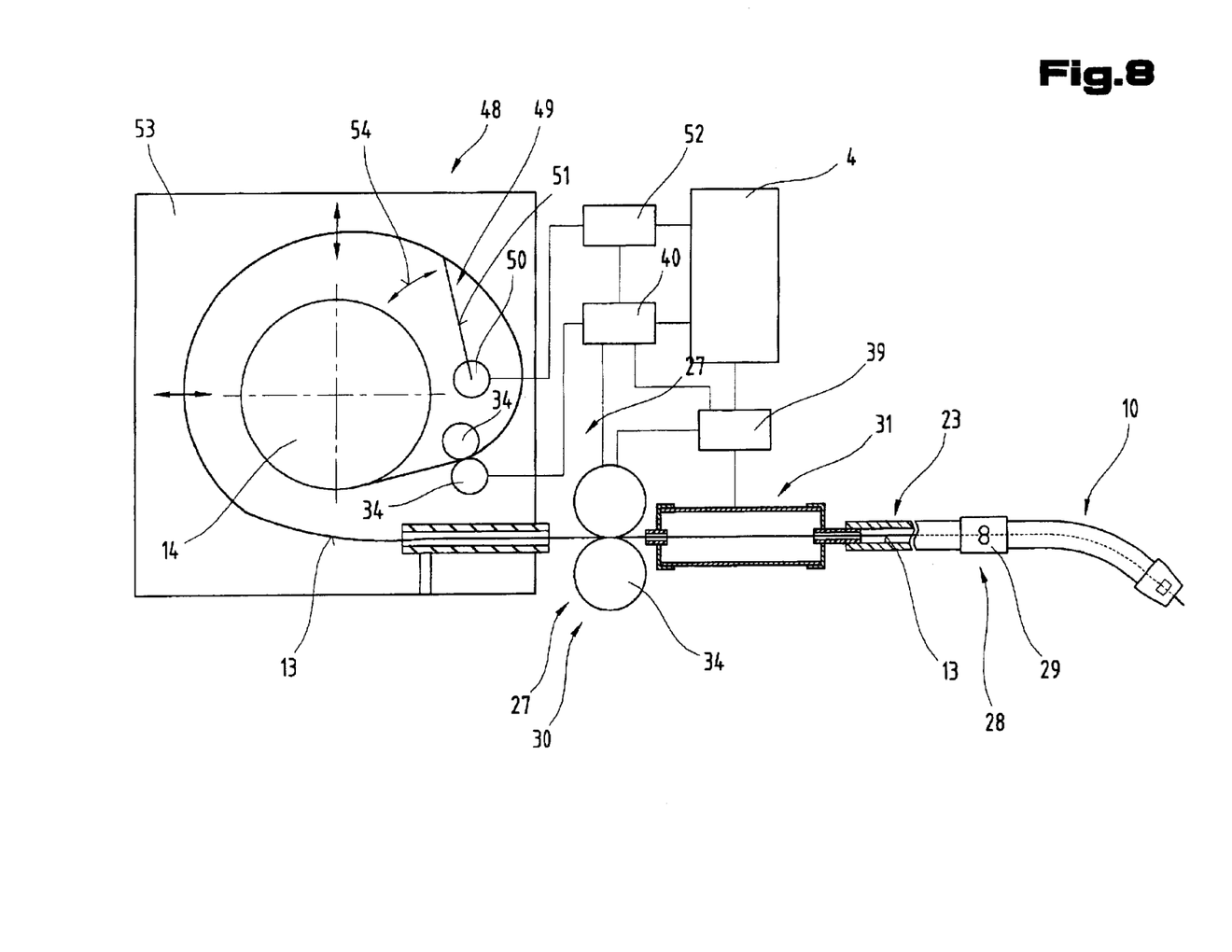
FIG. 8 is a simplified, schematic diagram illustrating another embodiment with the wire wheel system and the sensor for detecting the feed pressure.

FIG. 8 illustrates another embodiment with a wire feed system for feeding and monitoring the welding wire 13 from the wire supply reel 14 to the welding torch 10.

This wire feed system represents a combination of the systems described with reference to FIGS. 1 to 7, i.e. the wire wheel unit 48 and the sensor, in particular the tubular sensor 31, are used in a welding system. Operation of this embodiment will not be described, since the details can be taken from the descriptions of FIGS. 1 to 7. It is merely pointed out that a welding wire feeder 27 is provided in order to feed the welding wire 13 from the wire supply reel 14 and, downstream of outlet from the wire wheel unit 48 for detecting the feed force or pressure force of the welding wire 13, welding wire feeders 27 and 28 are provided, in particular the main drive 29 on the welding torch 10 and the auxiliary drive 30 in the region of the wire supply reel 14, i.e. in this configuration, three welding wire feeders 27, 28 are now used, which are controlled by speed regulator unit 40 separately from one another.

It should also be point that the detector unit 39 and the controller unit 52 described above may be assume by the speed regulator unit 40 or the function of the speed regulator unit 40 may assume by the control system 4 of the welding device 1.

Finally, it should be pointed out that the individual parts or components or groups of components used for the embodiments described above have been illustrated in a simplified or schematic form only. Furthermore, the individual parts of the combinations of characterising feature used in the individual embodiments described may be combined with other individual features from other examples of embodiments and be construed as independent solutions proposed by the invention.

Above all, the individual embodiments illustrated in FIGS. 1; 2, 3; 4; 5, 6; 7; 8 represent independent solutions proposed by the invention. The tasks and solutions addressed by the invention may be found in the detailed descriptions of these drawings.

| List of reference numbers | |
|---|---|
| 1 | Welding device |
| 2 | Current source |
| 3 | Power component |
| 4 | Control system |
| 5 | Switching element |
| 6 | Control valve |
| 7 | Supply line |
| 8 | Gas |
| 9 | Gas storage |
| 10 | Welding torch |
| 11 | Wire feed device |
| 12 | Supply line |
| 13 | Welding wire |
| 14 | Wire supply reel |
| 15 | Arc |
| 16 | Workpiece |
| 17 | Supply line |
| 18 | Supply line |
| 19 | Cooling circuit |
| 20 | Flow indicator |
| 21 | Water container |
| 22 | Input and/or output device |
| 23 | Hose pack |
| 24 | Connector device |
| 25 | Tension-relieving device |
| 26 | Housing |
| 27 | Welding wire feeder |
| 28 | Welding wire feeder |
| 29 | Main drive |
| 30 | Main drive |
| 31 | Tubular sensor |
| 32 | Drive motor |
| 33 | Drive motor |
| 34 | Drive element |
| 35 | Housing |
| 36 | Wire infeed guide |
| 37 | Wire outfeed guide |
| 38 | internal diameter |
| 39 | Detector unit |
| 40 | Speed regulator unit |
| 41 | Light barrier |
| 42 | Pressure element |
| 43 | Baffle system |
| 44 | Pressure sensor |
| 45 | Ring |
| 46 | Ring |
| 47 | Pressure element |
| 48 | Wire wheel unit |
| 49 | Detection means |
| 50 | Rheostat |
| 51 | Lever |
| 52 | Controller unit |
| 53 | Rousing case |
| 54 | Arrow |

What is claimed is:

1. Method of monitoring a feed force on a welding wire as the welding wire (13) is fed from a wire supply reel (14) to a welding torch (10), the feed force being implied by at least one welding wire feeder (27) and another welding wire feeder (28) for applying the feed force acting on the welding wire (13) in a feed direction, and the feed force is directly detected in a wire feed between the at least one welding wire feeder (27) and the other welding wire feeder (28), characterised in that a displacement of the welding wire (13) transversely to the feed direction caused by the feed force is detected in a tubular sensor (31) between the at least one welding wire feeder (27) and the other welding wire feeder (28), the feed force or rate of the at least one welding wire feeder (27) or the other welding wire feeder (28) is varied in dependence on the extent of the transverse displacement within the interior of the tubular sensor, and the welding wire is deflected by a baffle system (48) in the interior of the tubular sensor from a centered rectilinear position in a predetermined direction whereby the direction of deflection of the welding wire is automatically determined when the required feed force is exceeded.

2. Method as claimed in claim 1, characterised in that the extent of the transverse displacement is determined on the basis of a desired/actual comparison.

3. Method as claimed in claim 2, characterised in that a desired extent of the transverse displacement is a value in the range within which the tubular sensor does not detect a signal.

4. Method as claimed in claim 1, characterised in that the at least one welding wire feeder (27) is a main drive (29) and is driven at a constant speed and the other welding wire feeder (28) is an auxiliary drive (30) and is driven at a variable and controllable speed.

5. Method as claimed in claim 4, characterised in that the speed of the other welding wire feeder (28) is regulated by a speed regulator unit (40).

6. Method as claimed in claim 5, characterised in that, on receiving a signal from a detector unit (39), the speed regulator unit (40) reduces the speed of the auxiliary drive (30).

7. Method as claimed in claim 6, characterised in that, on receiving a signal from the detector unit (39), the speed regulator unit (40) regulates the other welding wire feeder (28) so that the feed force on the welding wire (13) is reduced.

8. Method as claimed in claim 6, characterised in that a signal is transmitted from the detector unit (39) to the speed regulator unit (40) if the welding wire (13) is deflected in the interior of the tubular sensor (31), so that it comes into contact with a housing (26) of the tubular sensor (31) and a short circuit is caused by the welding wire (13) between a drive element (34) of the welding wire feeders (27, 28) and the housing (26).

9. Method as claimed in claim 4, characterised in that the feed force between the main drive (29) and the auxiliary drive (30) is detected by the tubular sensor (31).

10. Method as claimed in claim 4, characterised in that, at an optimum feed force from the auxiliary drive (30) towards the main drive (29), the welding wire runs (13) through the tubular sensor (31), at the centered position.

11. Method as claimed in claim 4, characterised in that the speed or a wire feed rate of the auxiliary drive (30) is higher, at least at times, than the speed or the wire feed rate of the main drive (29).

12. Method as claimed in claim 1, characterised in that the feed force is detected by the tubular sensor (31) transversely to the feed direction of the welding wire (13).

13. Method as claimed in claim 1, characterised in that the deflection of the welding wire (13) from the centered position in the tubular sensor (31) is detected on the basis of the feed force.

14. Method as claimed in claim 1, characterised in that at least one light barrier (41) is provided in the interior of the tubular sensor (31), by means of which the deflection of the welding wire (13) from the central position in the tubular sensor (31) is detected.

15. Method as claimed in claim 1, characterised in that at least one pressure element (42, 47) is provided in the interior of the tubular sensor (31), which, on contact, transmits an electric signal proportional to the contact force.

16. Method as claimed in claim 1, characterised in that a partial or lateral deflection of the welding wire (13) against at least one detector point in the region between the at least one welding wire feeder (27) and the other welding feeder (28) is detected by a pressure sensor (44).

17. Device for monitoring a feed force on a welding wire (13) as the welding wire (13) is fed from a wire supply reel (14) to a welding torch (10), comprising a first welding wire feeder (27), another welding wire feeder (28) for enhancing the feed force, a tubular sensor (31) for detecting the feed force, the first welding wire feeder (27) being associated with the wire supply reel (14) and the other welding wire feeder (28) being associated with the welding torch (10), the wire being fed from the wire supply reel (14) to the welding torch (10) via a hose pack (23) or a guide system, the tubular sensor being associated with the welding wire (13) to detect a fluctuation in the feed force, tubular sensor (31) being arranged between the first welding wire feeder (27) and the other welding wire feeder (28), and serving to detect a deflection of the welding wire (13) away from a feed direction in the interior of the tubular sensor, and a baffle system (43) in a housing (35) of the tubular sensor for deflecting the welding wire from a centered rectilinear position in a predetermined direction whereby the direction of deflection of the welding wire is automatically determined when the required feed force is exceeded.

18. Device as claimed in claim 17, characterised in that the first welding wire feeder (27) is an auxiliary drive (30) and the other welding wire feeder (28) is a main drive (29).

19. Device as claimed in claim 17, characterised in that the tubular sensor (31) is disposed in a feed direction of the welding wire (13) and encloses a part of the welding wire (13).

20. Device as claimed in claim 17, characterised in that at least one of the welding wire feeders consists of a drive motor (32, 33) and at least one drive element (34) acting on the welding wire (13).

21. Device as claimed in claim 17, characterised in that the tubular sensor (31) comprises a housing (35), with a wire infeed guide (36) and a wire outfeed guide (37), made from a material that is not electrically conductive.

22. Device as claimed in claim 17, characterised in that the tubular sensor (31) is made from a material that is electrically conductive and has an internal diameter larger than an external diameter of the welding wire (13).

23. Device as claimed in claim 17, characterised in that the tubular sensor (31) is connected to a detector unit (39), which is in turn electrically connected to at least one of the welding wire feeders.

24. Device as claimed in claim 23, characterised in that the detector unit (39) is connected to a speed regulator unit (40) co-operating with at least one of the welding wire feeders.

25. Device as claimed in claim 17, characterised in that the tubular sensor (31) has at least one pressure element (42) in the interior.

26. Device as claimed in claim 17, characterised in that at least one light barrier (41) consisting of a light-emitting element and-a light-sensitive element is provided in the interior of the tubular sensor (31).

27. Device as claimed in claim 17, characterised in that the tubular sensor is a pressure sensor (44) disposed at a detector point and enclosing the welding wire (13).

28. Device for feeding welding wire (13) from a wire supply reel (14) to a welding torch (10), comprising a first welding wire feeder (27) and another welding wire feeder (28) assigned to the wire supply reel (14) provided in the form of a welding wire roller, the wire being fed from the wire supply reel (14) to the welding torch (10) via a hose pack (23) or a guide system, in particular a tube provided in the hose pack (23) or in the guide system, and a wire wheel unit (48) in which the welding wire (13) runs in a looping shape is disposed before the point at which the welding wire (13) enters the hose pack (23) or the guide system, a detection means (49), in particular a sensor, being assigned to the welding wire (13) in the wire wheel unit (48) to detect the bending behaviour of the welding wire (13), characterised in that the wire supply reel (14) is disposed so as to rotate at the center of the loop-shaped path of the welding wire (13) in the wire wheel unit (48), the detection means (49) being an angle sensor or a rheostat (50) and the detection means is applied via a rigid lever (51) attached thereto to the welding wire (13) in the wire wheel unit (48) and the detection means (49) is connected to a controller unit (52) for the welding wire feeder (27) and/or the apparatus, in particular the other welding wire feeder (28).

29. Device as claimed in claim 28, characterised in that the detection means (49) is set up so to transmit information for controlling the first welding wire feeder (27).

30. Device as claimed in claim 28, characterised in that the first welding wire feeder (27), in particular a main drive (29) co-operates with the welding torch (10) and the other welding wire feeder (28), in particular an auxiliary drive (30), co-operates with the wire supply reel (14).

31. Device as claimed in claim 28, characterised in that the lever (51) of the detection means (49) is joined to the welding wire (13) so as to be displaceable therewith.

32. Device as claimed in claim 28, characterised in that the wire wheel unit (48), the wire supply reel (14), the first welding wire feeder (27), in particular its drive elements (34), and the other welding wire feeder (28), as well as the detection means (49) are arranged in a wire supply housing, in particular in a housing case (53) of the welding device (1).

33. Device as claimed in claim 28, characterised in that the wire wheel unit (48) has a housing case (53), which is designed to impart a loop-shaped, freely displaceable course to the welding wire (13), about the wire supply reel (14).

34. Device as claimed in claim 28, characterised in that the detection means (49) is designed to monitor the loop-shaped path of the welding wire (13) about the wire supply reel (14).

35. Device as claimed in claim 28, characterised in that the detection means (49), in particular the angle sensor or the rheostat (50) is disposed, along with the lever (51) within the loop-shaped path of the welding wire (13).

* * * * *